W. Borrman.
Egg Beater.

Nº 20,032. Patented Apr. 27, 1858.

UNITED STATES PATENT OFFICE.

W. BORRMAN, OF CINCINNATI, OHIO.

APPARATUS FOR BEATING EGGS, CHURNING, AND THE LIKE PROCESSES.

Specification of Letters Patent No. 20,032, dated April 27, 1858.

*To all whom it may concern:*

Be it known that I, WILLIAM BORRMAN, of Cincinnati, Hamilton county, Ohio, have invented a new and useful Apparatus for Beating Eggs, Churning, and other Analogous Uses; and I hereby declare the following to be a full and exact description of the same, reference being had to the accompanying drawing, making part of this specification.

The leading features of novelty in this invention consist 1st in the provision of a semispherical dasher formed of wire or other open work and rotated concentrically within a bowl of corresponding size and form. 2nd, in an arrangement for retaining beyond the action of the dasher such portions of the egg or other matters as are sufficiently beaten.

Figure 1:
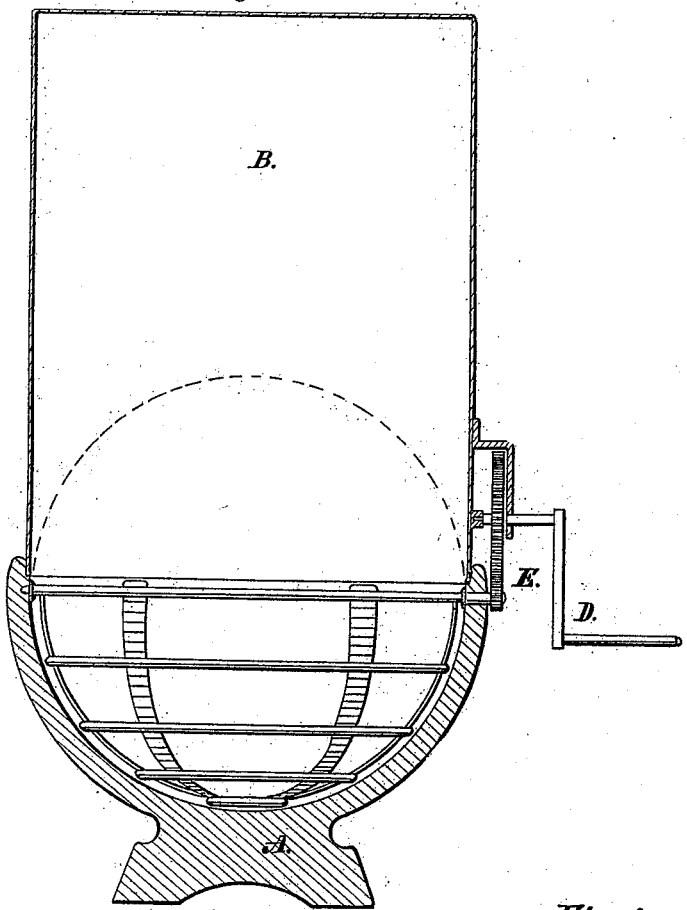
Figure 2:
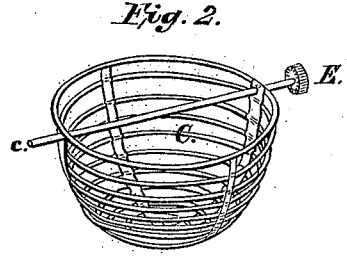
Figure 3:
Figure 4:
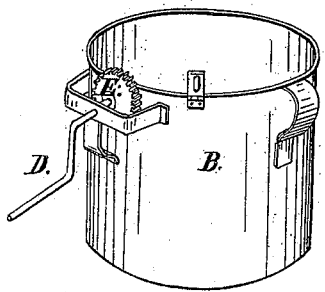

In the accompanying drawing Figure 1 represents a vertical axial section of the apparatus. Figs. 2, 3 and 4 are separate perspective views of the various parts on a smaller scale.

A, is a bowl or cup of earthenware or other suitable material whose interior is of semispherical form. Fitting a rabbet in the margin of this bowl is an inverted cup B, which may be of tin.

C, is a semi-spherical dasher constructed of wire or like open work and of each size as to nearly graze the cavity of the bowl, within which it is concentrically journaled by a shaft $c$, fitting in a notch $a$, and dimple $a'$, in the sides of the bowl A. Provision is made for rapidly rotating the dasher by means of a crank D, and gearing E. The shaft $c$, may extend across the dasher or not as preferred.

The operation of beating eggs is as follows:—The cup B, being removed, the whites of eggs are poured into the bowl A, and the cup replaced. The dasher being then rotated, the eggs are subjected to such attrition between the sides of the bowl and the closely adjacent surface of the dasher as to be rapidly reduced to the desired frothy state and is by the centrifugal action of the dasher projected into the upper part of the cup B, where the frothy portion remains, while the still liquid portion flowing back into the bowl A, is quickly reduced to froth and deposited in the cup with the rest. When the beating is completed, the cup B, being removed is found to contain the bulk of the beaten matter and forms a convenient receptacle for mixing therewith any further ingredients.

As a churn this apparatus is also found to be remarkably effective, the butter gathering within the dasher with great rapidity and success, from whence it is readily removed in a compact mass. It is also admirably adapted for whipping cream, cake frosting and various culinary operations of analogous character.

The dasher revolving in a vertical plane the gravity of the matter subject to operation opposes any tendency to vertical motion and thus the inertia of the mass constantly presents the desired resistance to the dasher, to which circumstance enhancing the violent chafing or churning action of the closely opposing surfaces presented by the bowl and the dasher, is mainly attributable the rapidity with which the work is performed.

After use the various parts are readily taken apart and cleansed.

The top of the cup B, or the entire cup may be made of glass to permit the watching of the operation.

I claim as new and of my invention herein,

1. The semispherical open work dasher C, in the described combination with a bowl A, of corresponding form and size for the purposes set forth.

2. In connection with the above I claim the inverted cup B, adapted to receive the egg or other matter as it becomes sufficiently beaten and retain it beyond the reach of the dasher.

In testimony of which invention I hereunto set my hand.

WM. BORRMAN.

Attest:
GEO. H. KNIGHT,
C. STEEMER.